United States Patent [19]
Kubouchi et al.

[11] Patent Number: 5,794,945
[45] Date of Patent: Aug. 18, 1998

[54] METAL GASKET

[75] Inventors: Kenji Kubouchi; Yutaka Furuta; Kazuyuki Geshi, all of Osaka, Japan

[73] Assignee: Nippon Gasket Co., Ltd., Osaka-fu, Japan

[21] Appl. No.: 755,146

[22] Filed: Nov. 22, 1996

[51] Int. Cl.$^6$ ............................................ F16J 15/08
[52] U.S. Cl. ................................... 277/593; 277/595
[58] Field of Search ............................ 277/180, 233, 277/235 B, 236

[56] References Cited

U.S. PATENT DOCUMENTS

| | | | |
|---|---|---|---|
| 5,205,566 | 4/1993 | Ueta et al. | 277/235 B |
| 5,286,039 | 2/1994 | Kawaguchi et al. | 277/180 |
| 5,294,135 | 3/1994 | Kubouchi et al. | 277/235 B |
| 5,348,315 | 9/1994 | Kawaguchi et al. | 277/180 |
| 5,601,292 | 2/1997 | Tanaka et al. | 277/180 |
| 5,609,345 | 3/1997 | Miura et al. | 277/180 |
| 5,626,348 | 5/1997 | Takada et al. | 277/180 |

FOREIGN PATENT DOCUMENTS

| | | |
|---|---|---|
| 0695896 | 2/1996 | European Pat. Off. |
| 0725241 | 8/1996 | European Pat. Off. |
| 5-039868 | 2/1993 | Japan |

*Primary Examiner*—Scott Cummings
*Attorney, Agent, or Firm*—Browdy and Neimark

[57] ABSTRACT

This metal gasket comprises a bead base plate with first beads and a sub-plate stacked on the bead base plate. The sub-plate is made of a thick metal plate and formed with second and third beads and stepped portions. The second beads, the third beads and the stepped portions combine to form triple seal lines, which improve the sealing function. The sub-plate is formed with the second beads opposing the first beads of the bead base plate, with the high third beads formed inside the second beads around the holes and with the stepped portions formed outside the second beads around the holes. The third beads prevent ingress of burning gases to the first beads and also serve as a stopper to prevent the first beads from being flattened completely. The third beads therefore can add durability to the sealing function realized by the first and second beads, enhancing the sealing performance of the first and second beads and reliably preventing burning gases from escaping between the opposing surfaces.

8 Claims, 5 Drawing Sheets

METAL GASKET

BACKGROUND OF THE INVENTION

1. Field of the Invention

The present invention relates to a metal gasket interposed between opposing surfaces of components in a multiple cylinder engine to provide a seal between them.

2. Description of the Prior Art

Engines having a cylinder block and an aluminum alloy cylinder head have light weight but low rigidity so that relative displacements between these components tend to increase when the engines are running. Hence, metal gaskets that seal between opposing surfaces of these structural members are generally made of an elastic metal plate that is formed with beads around through-holes for cylinder bores (combustion chambers), water holes and oil holes.

The metal gasket is used to seal between the opposing surfaces of the cylinder head and the cylinder block. The metal gasket has beads formed around through holes corresponding to the cylinder bores and water and oil passages. When the metal gasket is tightened between the cylinder head and the cylinder block, the beads form elastic annular contact portions against the opposing surfaces and thereby seal between the opposing surfaces.

As demands for higher output and lighter weight are being made of engines in recent years, there are growing trends for making the cylinder head and cylinder block from aluminum alloy with a smaller specific gravity instead of conventional materials such as steel and casting with a large specific gravity. The aluminum alloy, though it is light, has low rigidity and the engine made of aluminum alloy tends to increase the relative displacement of the cylinder head with respect to the cylinder block during operation. When a single-plate metal gasket is disposed between the opposing surfaces of the cylinder head and cylinder block and fastened with tightening bolts, the opposing surfaces easily become misaligned because the bolt positions are distributed along the outer periphery or relatively outer peripheral portion of the metal gasket and distributed not necessarily evenly around the combustion chamber bores. As a result, hot high-pressure burning gases will escape into a space between opposing surfaces at large-strain the areas between the combustion chamber bores, eroding and contaminating beads of the metal gasket interposed between the opposing surfaces and degrading its sealing performance.

In the case of the cylinder head gasket, the clearance between the cylinder head and the cylinder block repetitively increases and decreases during the combustion cycles of the engine, applying repetitive mechanical stresses and thermal stresses to the metal gasket. The load variation stresses in the engine produce the greatest effects where the rigidity is lowest in the cylinder block and cylinder head, resulting in unwanted permanent set in fatigue and cracking of beads, deteriorating the sealing performance.

Japanese Patent Laid-Open No. 39868/1993 filed by the applicant of this invention discloses a metal gasket, which comprises a first elastic metal plate having beads and a folded portion and a second elastic metal plate having beads, with the first and second elastic metal plates stacked together so that their beads oppose each other and are held in contact. If misalignment occurs between the two opposing surfaces when these two elastic metal plates of the metal gasket are tightened, the beads and folded portion deform according to the strains, offsetting the misalignment. Thus, the repetitively varying loads during the combustion cycles of the internal combustion engine are shared by the metal gasket clamped between the opposing surfaces, limiting the amount of distortion of the cylinder head, improving the cylinder head motion follow-up performance, preventing total compression of the beads, thereby enhancing the sealing performance. The folded portion of the elastic metal plate prevents corrosion and contamination of the beads due to escaping hot high-pressure burning gases and further prevents unwanted permanent set in fatigue and cracking of beads even when subjected to large varying load stresses that occur in areas of the cylinder head with the lowest rigidity. Therefore, the combined thickness of the two elastic metal plates and the folded portion together provide a stopper function, reducing the load stresses at bead positions and improving the durability.

The above metal gasket, however, requires high machining precision in order to form the folded portion in the elastic metal plate and must use a material with good workability in forming the folded portion, for example, a material with high elongation coefficient, low hardness and low tensile strength. Moreover, working an elastic metal plate into the folded portion will easily cause cracks, and the folded portion may be cracked during engine operation, too.

Because in the metal gasket the thickness of the elastic metal plate with a folded portion has an additional thickness of the folded portion, surface pressures will easily concentrate in the folded portion around the combustion chamber bore. The degree of face-to-face pressure concentration in the folded portion increases as the thickness of the elastic metal plate increases. To avoid the face-to-face pressure concentration, the selection of the thickness of the elastic metal plate is limited, from the standpoint of face-to-face pressure balance, to 0.10-0.15 mm at the greatest. Further, considering the compression caused by the concentrated face-to-face pressures, the folded portion, if it has a two-plate thickness, is compressed to a 1.5-plate thickness. When, on the other hand, the thickness of the elastic metal plate with the folded portion is made too thin, its function as the stopper will deteriorate, lowering the strength of the elastic metal plate itself, with the result that the elastic metal plate can no longer withstand the shearing force in the plane of opposing surfaces caused by the thermal expansion difference between the cylinder head and the cylinder block and therefore breaks. Hence, the metal gasket having an elastic metal plate provided with a folded portion has a reduced freedom of design in terms of plate thickness.

Under these circumstances, there are demands for a structure of the metal gasket which does not require forming a folded portion out of a metal plate stacked on the elastic metal plate; which has multiple sealing functions around holes; which has a stopper function to prevent total compression of beads of the elastic metal plate while in use; and which can offset misalignment between the opposing surfaces.

SUMMARY OF THE INVENTION

This invention relates to a metal gasket comprising: a bead base plate made of an elastic metal plate and formed with beads around parallelly arranged first holes; and a sub-plate having parallelly arranged second holes aligned with the first holes and stacked on the bead base plate, the sub-plate having a thickness two to five times the thickness of the bead base plate, the sub-plate having second beads, third beads and stepped portions, the second beads opposing the first beads of the bead base plate and adapted to contact the first beads to provide a sealing function, the third beads being arranged inside the second beads and around the second holes and having a sealing function and a stopper function, the stepped portions being arranged outside the second beads and around the second holes and having a sealing function.

Because of the above construction, this metal gasket has triple seal lines formed around the holes by the beads, the stopper beads and the stepped portions. The triple seal lines not only improve the sealing function but also prevent total compression of the beads of the bead base plate by the stopper function of the beads on the hole side and prevent escaping of burning gases to the beads of the bead base plate by the sealing function of the beads and stepped portion of the sub-plate, thereby improving the corrosion resistance and durability of the beads of the bead base plate and offsetting misalignment by the beads deforming according to the misalignment of the opposing surfaces.

In this metal gasket, the third beads on the inside of the second beads in the sub-plate are higher than the second beads but with the height difference between the second and third beads set smaller than the bead height of the bead base plate. When the third beads are pressed against the bead base plate, the metal gasket produces a sealing effect. Further, when tightened and fixed between the opposing surfaces, the metal gasket can perform the stopper function to prevent total compression of the first beads of the bead base plate.

Further, this metal gasket has parts of the third beads of the sub-plate set high at least in areas where the adjacent holes are close to each other. The areas where the adjacent holes are close to each other are areas where the load variation stresses of the engine are large and the clearance between the opposing surfaces varies more greatly than in other areas, making it more likely for the sealing function to deteriorate easily. Hence, in these areas the face-to-face pressure of the metal gasket as it is installed between the opposing surfaces should preferably be set higher than in other areas. The face-to-face pressure of the metal gasket can be increased by selecting an appropriate height of the third beads of the sub-plate.

Further, this metal gasket is surface-treated with a nonmetallic material, i.e., the both surfaces of the bead base plate and the one surface of the sub-plate on the opposite side of the bead base plate are coated with fluororubber and then with acrylic silicone resin. The nonmetallic layer placed over the surfaces of the bead base plate and the sub-plate covers the rough surfaces produced by the machining and offers a sufficient sealing performance.

The metal gasket of the above construction prevents total compression of the second beads and the beads base plate's beads and thereby protects them against breakage. It also assures proper sealing function at all times, improves the durability of these beads, does not require a space member, a folded portion or an intermediate plate as does the conventional gasket, and can reduce the number of parts and enhance reliability with reduced cost. Because the stepped portions formed in the sub-plate add areas that perform the sealing function between the sub-plate and the bead base plate, leakage of burning gases can be prevented more reliably. Furthermore, the deformations of the beads offset misalignment between the opposing surfaces, establishing the balance of face-to-face pressures round the holes when the gasket is installed between the opposing surfaces.

This metal gasket, as described above, basically uses only two metal plates of different thicknesses and has a greater freedom of the gasket thickness, offering an increased design margin and performing a stable and reliable sealing function.

That is, the sub-plate are formed with a multiple sealing structure between the sub-plate and the surface of a structural member facing the sub-plate. This construction, combined with an increased rigidity of the metal gasket as a whole realized by the large thickness of the sub-plate, ensures stable and reliable sealing function.

Because the multiple seal lines improve the sealing performance and reliably blocks ingress of hot, corrosive gases, such as burning gases, from the hole side to the bead side, this metal gasket protects the beads against undesired permanent set in fatigue and cracking and prevents degradation of the bead function.

The third beads of this metal gasket perform a stopper function for the beads of the bead base plate to prevent the total compression of the bead base plate's beads. For example, the third beads are set higher than the second beads such that the height difference from the second beads is set smaller than the height of the bead base plate's beads. This arrangement limits by the third beads the compression of the bead base plate as the metal gasket is installed between the opposing surfaces, thus preventing the total compression of the beads of the bead base plate.

Because of the above construction, the metal gasket prevents unwanted permanent set in fatigue of the beads of the bead base plate and can secure the sealing function over long periods of service. The third beads as the stopper beads can perform the sealing function and the face-to-face pressure adjusting function, equivalent to those of the conventional gasket with a folded portion, and, because of the absence of restrictive conditions in the material selection compared with the folded portion, can reduce the manufacture cost and substantially improve the durability. The third beads are not formed with the folded portion and thus can be constructed of a thick metal plate, which obviates the need for crack prevention measures required when forming the folded portion.

The sub-plate does not require the use of expensive materials such as elastic metal plates and can use relatively inexpensive ordinary steel, which has higher workability in terms of material hardness and rigidity. The sub-plate need only be worked to form simple shapes such as the beads and stepped portions and does not require complex and costly machining as required when forming the folded portion. This offers various advantages of keeping the manufacture cost of the sub-plate reasonably low, increasing the machining precision of parts, reducing the accumulated errors, facilitating the control of height of the third beads as the stopper beads, enhancing the sealing performance, and providing the metal gasket with increased reliability.

The beads of the bead base plate and of the sub-plate and the stepped portions of the sub-plate function as an alignment compensator that offset misalignment between the opposing surfaces. When there is a misalignment between the opposing surfaces of the cylinder head and the cylinder block, the beads and the stepped portions deform following the misalignment of the opposing surfaces to offset uneven distribution and variations of clearance between the opposing surfaces and clearance variations during engine operation, all of which are causes for gas leakage.

The metal gasket is so arranged that the bead base plate is placed on the cylinder head side where the rigidity is relative low and the sub-plate is placed on the cylinder block side where the rigidity is relatively high. This arrangement balances the rigidity over the entire engine, enhancing the metal gasket's capability to deform following the misalignment between the opposing surfaces. The high misalignment offsetting capability of the metal gasket, as well as the ability of the beads and stepped portions to be set to arbitrary dimensions, ensures appropriate adjustment of the balance of face-to-face pressures around the holes.

Furthermore, because the third beads can be accommodated in spaces formed near the holes between the flat surface and the beads of the bead base plate, it is possible to reduce a dead space and improve the storage efficiency of the metal gaskets stacked in a storage container before being installed into engines.

DETAILED DESCRIPTION OF THE EMBODIMENT

Figure 1:
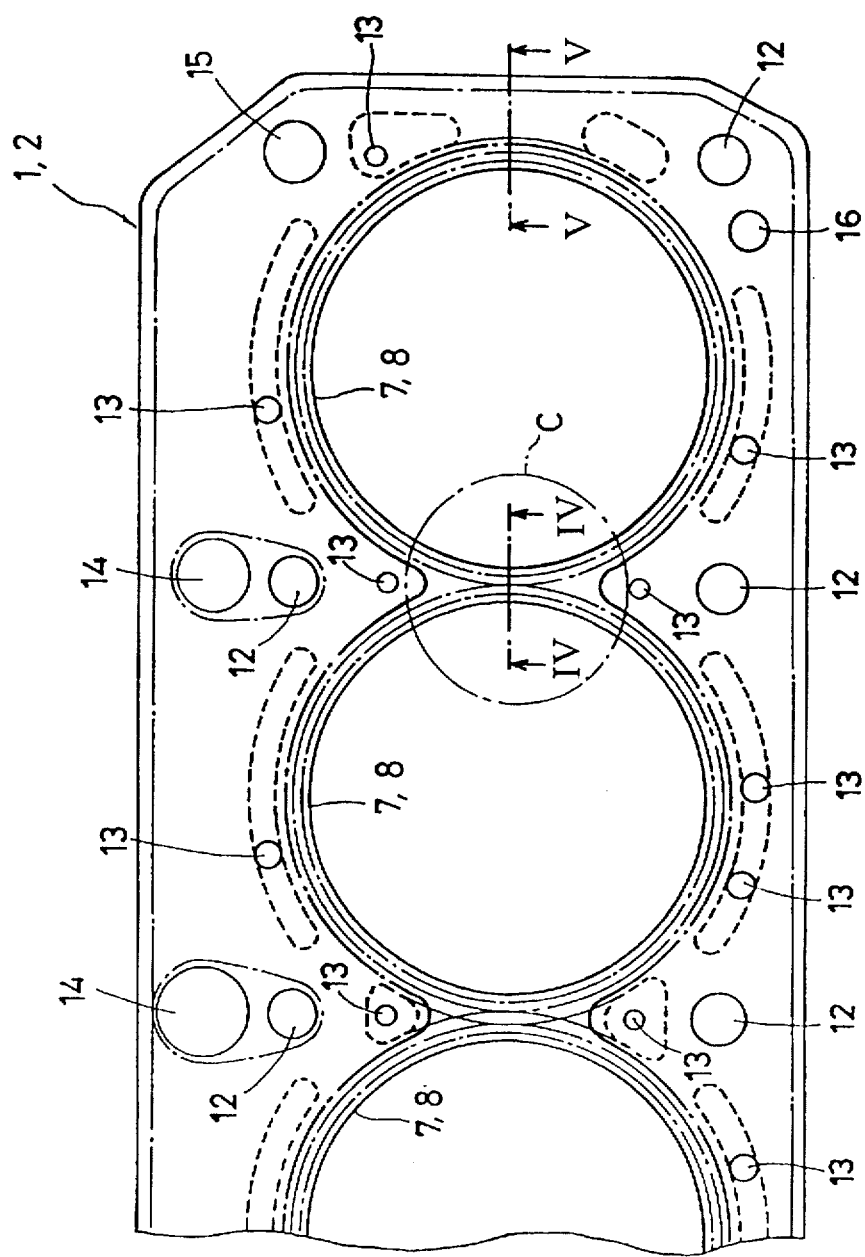
FIG. 1 is a partial plan view showing one embodiment of the metal gasket of the present invention.
Figure 2:
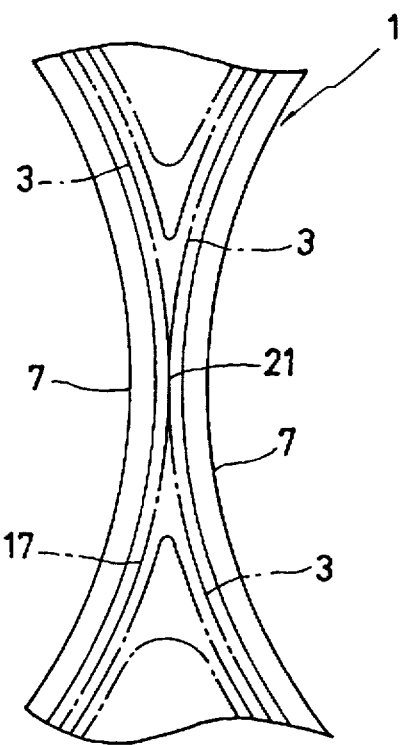
FIG. 2 is an enlarged plan view of a part C of a bead base plate of the metal gasket of FIG. 1.

Now, embodiments of the metal gasket of this invention will be described. This metal gasket can be applied to a head gasket that is held between the cylinder head and the cylinder block to seal between their opposing surfaces and which has combustion chamber holes (hereinafter referred to simply as holes) parallelly formed therein at positions corresponding to cylinder bores. The metal gasket has two or more holes parallelly formed therein so that it can be applied to multi-cylinder engines such as four-cylinder and six-cylinder engines. In the drawings showing embodiments, parts and components having the same constructions and functions are assigned like reference numbers, and their explanations are not repeated.

By referring to FIG. 1 to 7, embodiments of the metal gasket of this invention will be explained. The metal gasket comprises a bead base plate 1, which is made of an elastic metal plate formed with holes 7 (first holes) at positions corresponding to parallelly arranged combustion chambers in a multi-cylinder engine, and a sub-plate 2, which is stacked below the bead base plate I and formed with holes 8 (second holes) aligned with the holes 7. The bead base plate I has bolt holes 12, water holes 13, blow-bye holes 14, knock holes 15 and oil holes 16, all formed around the holes 7. Similarly, the sub-plate 2 is formed with holes aligned with the holes of the bead base plate 1. The bead base plate 1 is formed with beads 3 (first beads) virtually concentric with the holes 7 and surrounding the holes 7 in circle and which are concave in cross section with a height h. The sub-plate 2 is formed with beads 4 (second beads) virtually concentric with the holes 8 and surrounding the holes 8 in circle and which are concave in cross section with a height hi.

Figure 6:
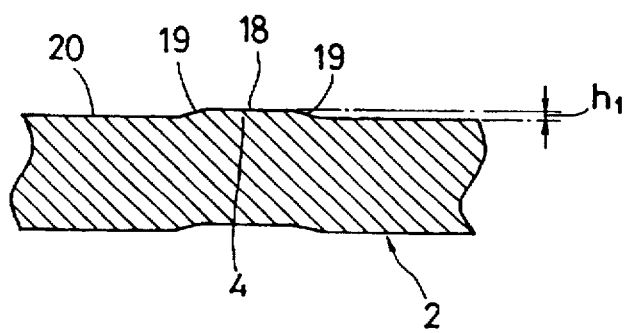
FIG. 6 is an enlarged cross section of a part of the metal gasket of FIG. 1 including the second beads of the sub-plate.
Figure 7:
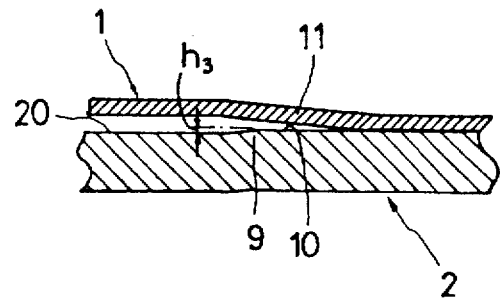
FIG. 7 is an enlarged cross section of a part of the metal gasket of FIG. 1 including a step portion of the sub-plate.

The bead base plate 1 and the sub-plate 2 are stacked together with the beads 3 and 4 opposing each other. The beads 3, 4 are formed with raised portions 17, 18, which face each other and are placed in contact with each other. As shown in FIG. 6 representing the enlarged cross section, the raised portions 18 have flat top surfaces, with which the raised portions 17 of the beads 3 are placed in contact. Forming the top surfaces the beads 4 flat allows the beads 3 of the bead base plate 1 to be placed stably on the beads 4, assuring a stable function of the beads 3 and offering a reliable sealing function. The inner and outer sides of the raised portions 18 are both formed as inclined surfaces 19, 19 joining a flat surface 20 of the sub-plate 2.

The sub-plate 2 is formed with beads 5 (third beads) on the hole 8 side of the beads 4 which project in the same direction as the beads 4 and have a height $h_2$ greater than the height $h_1$ of the beads 4 but with the height difference from the beads 4 less than the height h of the beads 3 of the bead base plate 1. Where the beads 5 are formed, the bead base plate 1 is formed flat at 6. The beads 5 reduces a dead space that tends to be formed between, in the vertical direction, the top of the beads 3 and the flat surface 6 when the bead base plate 1 and the sub-plate 2 are stacked. When the metal gasket is tightened between the opposing surfaces, the heads 5 contact the opposing flat surface 6 of the bead base plate 1 to produce a concentrated face-to-face pressure for sealing.

The sub-plate 2 is formed with annular stepped portions 9 along the beads 4 on the outer side of the beads. The stepped portions 9, as they extend from the inside on the hole 8 side toward the outside, are formed into flat surfaces 10 approaching the bead base plate 1. The step height $h_3$ of the stepped portions 9 is almost equal to the bead height $h_2$ of the beads 4. As shown in the enlarged cross section of FIG. 7, the bead base plate 1 is formed with half beads 11 facing the stepped portions 9 and approaching the sub-plate 2, with the edge of the stepped portions 9 corresponding to the intermediate position of the half beads 11.

Figure 3:
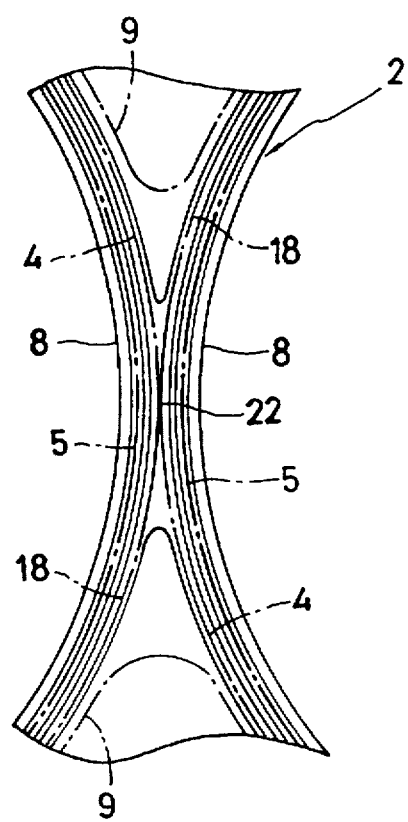
FIG. 3 is an enlarged plan view of a part C of a sub-plate of the metal gasket of FIG. 1.
Figure 4:
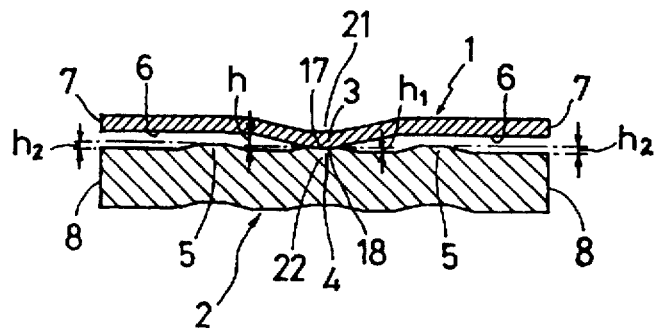
FIG. 4 is a cross section of one embodiment of the metal gasket taken along the line A—A of FIG. 1.
Figure 5:
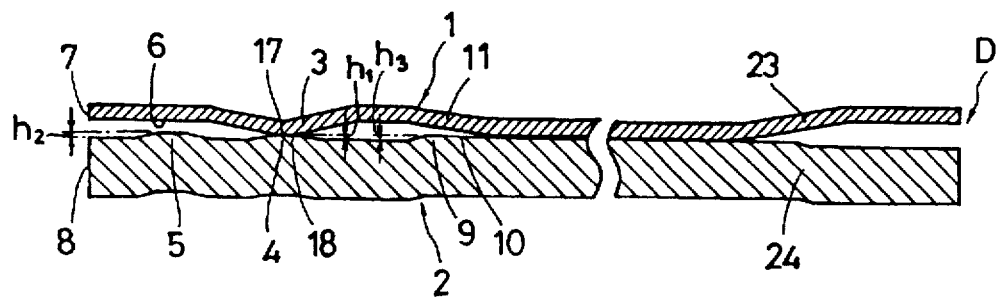
FIG. 5 is a cross section of one embodiment of the metal gasket taken along the line B—B of FIG. 1.

The adjacent beads 3 formed on the bead base plate 1 join in areas between the holes 7 to form a strip of united bead (FIG. 2); similarly, the adjacent beads 4 formed on the sub-plate 2 join in areas between the holes 8 to form a strip of united bead (FIG. 3). The adjacent beads 5 on the sub-plate 2, however, are formed independently of each other in areas between the holes 8 without joining. In a peripheral area D of the metal gasket, the bead base plate 1 and the sub-plate 2 are formed with a half bead 23 and a stepped portion 24, respectively, and are separated as shown in FIG. 5. When tightened together, the opposing surfaces of the peripheral areas come into hermetic contact with each other. The opposing plates of the metal gasket in the peripheral area D are not limited to the structure described above and may be stacked together in hermetic contact.

This metal gasket forms triple seal lines at three locations by the beads 3 of the bead base plate 1, and the beads 4, 5 and stepped portions 9 of the sub-plate 2 , offering a very strong sealing structure. Because the thickness of the sub-plate 2 is two to five times larger than that of the bead base plate 1, the beads 4, 5 and stepped portions 9 of the sub-plate 2 generally have far greater rigidities than the bead base plate 1.

Therefore, when fastened between the opposing surfaces to be sealed, the metal gasket has a strong resistance to deformations, with the beads 4, 5 pressing strongly against the beads 3 and flat surface 6 of the bead base plate 1 to provide a seal and with the beads 5 also working as stopper beads, because their height is greater than that of the beads 4, to prevent total compression to the beads 3 of the bead base plate 1 or prevent them from being completely flattened. Further, the stepped portions 9 of the sub-plate 2 press strongly against the half beads 11 of the bead base plate 1, performing the intended sealing function. Hence, the hot high-pressure burning gas in the combustion chamber is reliably prevented from leaking by the triple seal lines of the metal gasket installed between the opposing surfaces of the components. Even if there is a misalignment around the combustion chamber hole between the opposing surfaces of the cylinder head and the cylinder block, the bead base plate 1 and the beads 4, 5 of the sub-plate 2 of the metal gasket installed between the opposing surfaces deform according to the misalignment, thereby offsetting the misalignment.

This metal gasket, for example, has the bead base plate 1 formed to a thickness of 0.2 mm and the sub-plate 2 to a thickness of 0.9 mm. Considering the fact that the cylinder block is hotter than the cylinder head, the bead base plate 1 is preferably arranged on the cylinder head side and the sub-plate 2 on the cylinder block side. Further, the heights of the beads 3 of the bead base plate 1 and of the beads 4, 5 of the sub-plate 2 as well as the height of the stepped portions 9 can be appropriately adjusted within the above basic dimensional relationship to adjust the face-to-face pressures generated at the beads 3, 4, 5 and the stepped portions 9. Changes in the thickness of the bead base plate 1 and the sub-plate 2 and in the height of the beads 3, 4, 5 and the stepped portions 9 increase the degree of freedom of design and combination.

Figure 8:
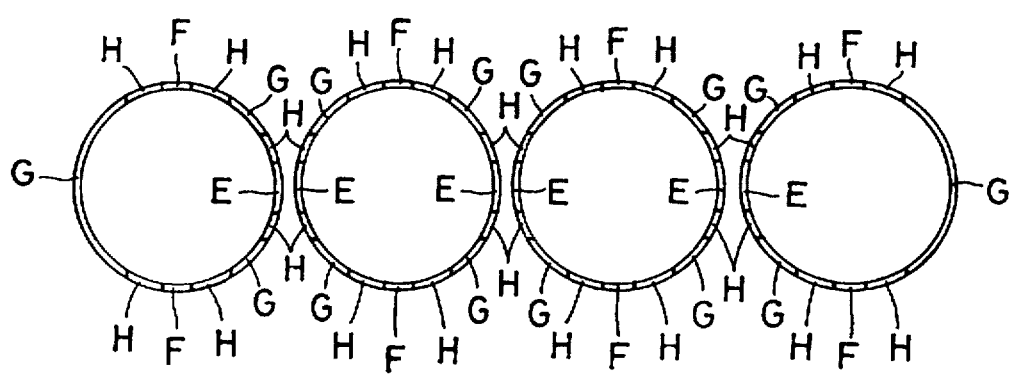
FIG. 8 is a schematic view showing third beads of the sub-plate of the metal gasket of FIG. 1 changed in height according to the circumferential position of the hole.

FIG. 8 shows the beads 5 of the sub-plate 2 varied in shape according to the circumferential position around the hole 8, with portions of the beads 5 between the bores, i.e., in areas between the holes 7 or holes 8 set high and with portions in other areas set low. In this embodiment, in areas E where the adjacent beads 5 are closest to each other, the beads 5 are set highest. In areas F differing 90 degrees in phase from the areas E, the bead height is set the highest. In areas G intermediate between the areas E and F, the beads are set the lowest. The external sides of the holes 8 at the ends are areas G where the bead height is lowest. In areas H between the areas E, F and the areas G, the bead height is made a gradation part, its height increasing toward the areas E, F and decreasing toward the area G. In this way, the height of the beads 5 is changed according to the circumferential position around the holes 8. Because the portions of the beads 5 in areas E between the adjacent holes 8 are set the highest, the sealing performance of the bead 5 can be enhanced. At the same time, the areas E can function as a stopper for the beads 4 that would otherwise be easily flattened completely. When tightened between the cylinder block and the cylinder head, the metal gasket can control the face-to-face pressures produced by the beads 3, 4, 5 to appropriate values by changing the bead heights and plate thicknesses so that the metal gasket will conform to the rigidity of the cylinder head.

Figure 9:
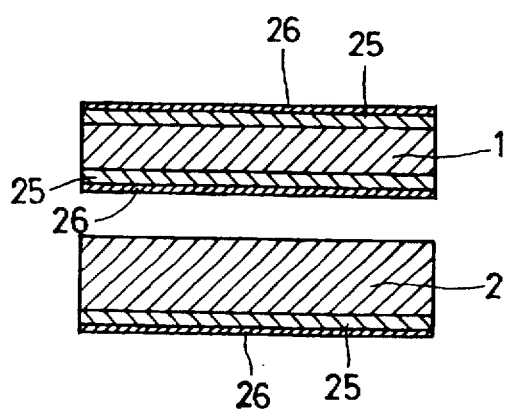
FIG. 9 is a partial cross section showing a crosssectional structure of the metal gasket of FIG. 1.

FIG. 9 shows the surface layer structures of the surface-treated bead base plate 1 and sub-plate 2. In this metal gasket, for example, the bead base plate 1 is made of SUS301 and the sub-plate 2 SECC. The both surfaces of an elastic metal plate, which forms the bead base plate 1, and the surface of a metal plate forming the sub-plate 2 on the opposite side of the bead base plate 1 are coated with a nonmetallic, heat-resistant, oil-resistant layer to a thickness of about 10–50 μm to avoid a metal-to-metal contact with the cylinder head and cylinder block, thus assuring the corrosion resistance, durability and strength required of the metal gasket. The both surfaces of the bead base plate 1 and the undersurface of the sub-plate 2 are coated with, for example, a fluororubber 25 which has heat resistance and oil resistance. The fluororubber 25 is further coated with an acrylic silicone resin 26. The nonmetallic layer placed over the surfaces of the bead base plate 1 and the sub-plate 2 covers the rough surfaces produced by the machining and offers a sufficient sealing performance.

Figure 10:
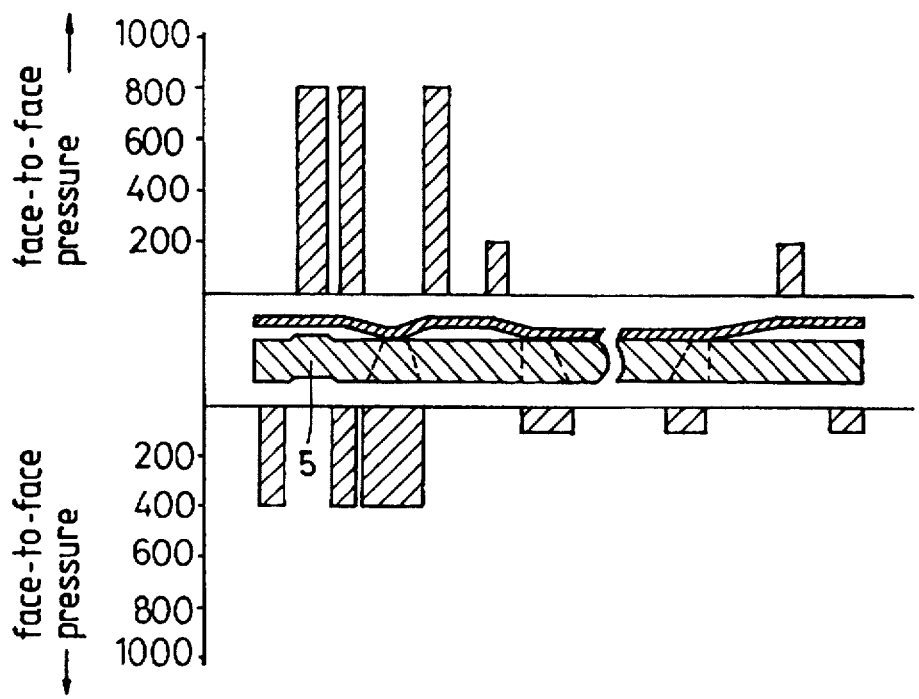
FIG. 10 is a graph showing a distribution of stresses produced when a metal gasket having only the third beads formed in the sub-plate is mounted between the opposing surfaces.
Figure 11:
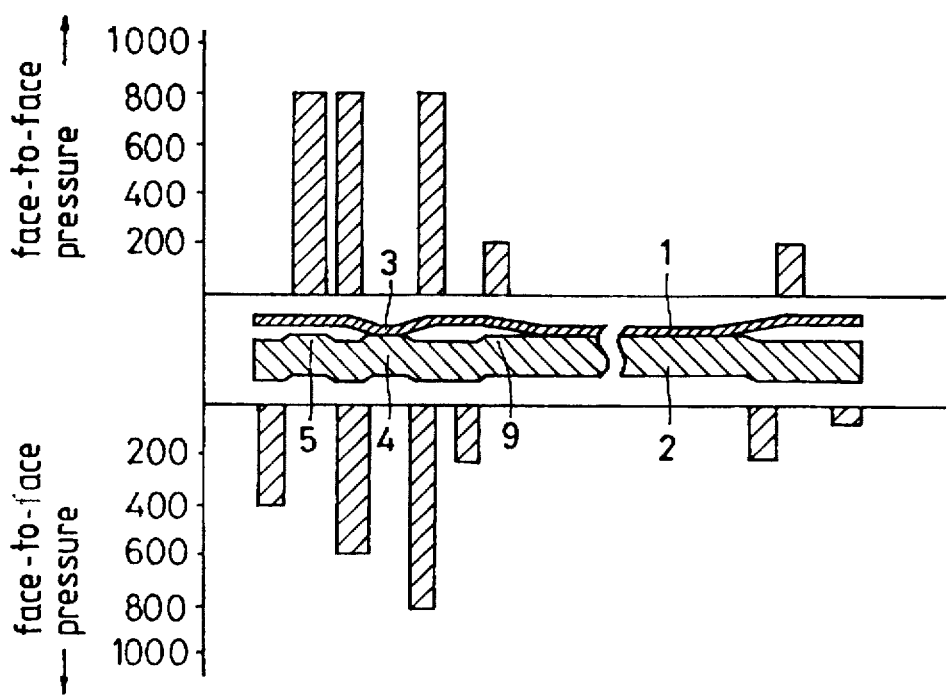
FIG. 11 is a graph showing a distribution of stresses generated when the metal gasket of FIG. 1 is fastened between the opposing surfaces.

FIG. 10 shows a distribution of stresses produced when a metal gasket having only the beads 5 formed as the stopper beads on the sub-plate 2 is tightened between the opposing surfaces. FIG. 11 shows a distribution of stresses produced when a metal gasket formed with the beads 4, 5 and the stepped portions 9 is tightened between the opposing surfaces. As is seen from FIG. 11, face-to-face pressure peaks occur at positions where the beads 3, 4, 5 are formed in the bead base plate 1 and the sub-plate 2. When the sub-plate is flat without any beads, only moderate face-to-face pressures, though not shown, are produced with low peaks occurring at both sides of the beads in the elastic metal plate and, in the sub-plate 2, at positions where it contacts the beads 3 of the bead base plate 1. In contrast to these gasket structures, the metal gasket shown in FIG. 11 has surface pressure peaks at both sides of the beads 4 and at the stepped portions 9 with their magnitudes sharper and stronger than those shown in FIG. 10. These indicate that the bead base plate 1 and the sub-plate 2 combine to form sharp and efficient triple deal lines (face-to-face pressure peaks occur at four locations) around the holes 7, 8.

What is claimed is:

1. A metal gasket comprising:
   a bead base plate made of an elastic metal plate and formed with first beads around parallelly arranged first holes; and
   a sub-plate having parallelly arranged second holes aligned with the first holes and stacked on the bead base plate,
   the sub-plate having a thickness two to five times the thickness of the bead base plate,
   the sub-plate having
   second beads opposing the first beads of the bead base plate and adapted to contact the first beads to provide a sealing function,
   third beads being arranged inside the second beads and around the second holes and having a sealing function and a stopper function to prevent total compression of the first beads of the bead base plate, and
   stepped portions being arranged outside the second beads and around the second holes and having a sealing function.

2. The metal gasket according to claim 1, wherein the third beads of the sub-plate are higher than the second beads such that a height difference between the second beads and the third beads is smaller than the height of the first beads of the bead base plate.

3. The metal gasket according to claim 1, wherein the third beads of the sub-plate are formed high in areas between at least the adjacent second holes.

4. The metal gasket according to claim 1, wherein both surfaces of the bead base plate and a surface of the sub-plate on the opposite side of the bead base plate are surface-treated with a nonmetallic material.

5. The metal gasket according to claim 1, wherein the bead base plate and the sub-plate include no folded portion.

6. The metal gasket according to claim 1, wherein the second bead (4) includes an upper raised portion (18) further including a flat top surface.

7. The metal gasket according to claim 1, wherein the third bead (5) opposes a flat surface (6) of the bead base plate.

8. A metal gasket comprising:

a bead base plate made of an elastic metal plate and formed with first beads around parallelly arranged first holes; and a sub-plate having parallelly arranged second holes aligned with the first holes and stacked on the bead base plate, the sub-plate having a thickness two to five times the thickness of the bead base plate, the sub-plate having second beads opposing the first beads of the bead base plate and adapted to contact the first beads to provide a sealing function, means for preventing ingress of burning gasses to the first beads and for preventing total compression of the first beads of the bead base plate, said means comprising third beads being arranged inside the second beads and around the second holes, and stopped portions being arranged outside the second beads and around the second holes and having a sealing function.

* * * * *